United States Patent
Fiedler (12) 
(10) Patent No.: US 6,181,157 B1
(45) Date of Patent: Jan. 30, 2001

(54) RESISTOR MIRROR

(75) Inventor: Alan S. Fiedler, Minneapolis, MN (US)

(73) Assignee: LSI Logic Corporation, Milpitas, CA (US)

(*) Notice: Under 35 U.S.C. 154(b), the term of this patent shall be extended for 0 days.

(21) Appl. No.: 08/967,150

(22) Filed: Nov. 10, 1997

(51) Int. Cl.[7] .................................................. H03K 17/16
(52) U.S. Cl. .................................. 326/30; 326/86; 326/33
(58) Field of Search .............................. 326/30, 33, 86, 326/83; 327/404

(56) References Cited

U.S. PATENT DOCUMENTS

| | | | |
|---|---|---|---|
| 5,506,528 | * 4/1996 | Cao et al. | 327/108 |
| 5,793,223 | * 8/1998 | Frankeny | 326/30 |
| 5,821,768 | * 8/1998 | Rau . | |

* cited by examiner

*Primary Examiner*—Jon Santamauro
*Assistant Examiner*—Don Phu Le
(74) *Attorney, Agent, or Firm*—Westman Champlin & Kelly, P.A.

(57) ABSTRACT

A circuit that provides a termination resistance to a transmission line includes a controllable termination resistor coupled between the transmission line and a termination voltage node. The circuit also includes a control circuit coupled to the controllable termination resistor and to a reference resistor. The control circuit matches the resistance of the controllable termination resistor to the resistance of the reference resistor.

29 Claims, 5 Drawing Sheets

RESISTOR MIRROR

BACKGROUND OF THE INVENTION

The present invention relates to terminating electrical transmission lines. In particular, the present invention relates to terminating transmission lines with a matched resistance.

In communication systems, and within complex electronics systems, electrical signals are transmitted from one location to another over transmission lines. Every transmission line has an inherent impedance that affects the electrical signal. To reduce reflectance of the signal, it is known to match the impedance of the transmission line with a resistance at both the signal source and the signal destination. This resistance is formed by a termination circuit that is connected between the transmission line and a fixed voltage, such as ground or a power supply.

The location of the termination circuit, relative to the transmitter that creates the signal, or the receiver that receives the signal, is critical to properly preventing reflected signals. In particular, the termination circuit should be placed as close as possible to the transmitter or receiver.

When transmitters and receivers are located in an integrated circuit, locating the termination circuit near the transmitter or receiver becomes difficult. It is difficult to place the termination circuit in the integrated circuit itself because resistive materials deposited on an integrated circuit tend to have a large temperature coefficient that causes the resistance of the material to vary widely as the temperature of the circuit changes. Because of these variations, the termination circuit will not always match the impedance of the transmission line.

Alternatively, termination circuits can be placed in a package in which the integrated circuit is seated for connection to the circuit board. However, placing the resistance in the package makes the package "integrated circuit specific", and thus increases the cost of manufacturing.

A termination circuit that can provide a stable resistance and is contained within the integrated circuit is desirable.

SUMMARY OF THE INVENTION

A circuit that provides a termination resistance to a transmission line includes a controllable termination resistor coupled between the transmission line and a termination voltage node. The circuit also includes a control circuit coupled to the controllable termination resistor and to a reference resistor. The control circuit matches the controllable termination resistor to the reference resistor.

In several embodiments of the present invention, the control circuit includes at least one controllable reference resistor. Preferably, the controllable reference resistor and the controllable termination resistor each include transistors operating in the triode region such that a change in the voltage at their gates causes a change in their resistance.

To control the resistance of the controllable termination resistor and the controllable reference resistor, the control circuit includes a feedback loop capable of controlling a voltage at a control node connected to the controllable reference resistor and the controllable termination resistor. In preferred embodiments, the control node is connected to the gates of the transistors in the controllable reference resistor and the controllable termination resistor. The voltage at the control node controls the resistance of the controllable reference resistor and the controllable termination resistor. Additional controllable termination resistors may be connected to the control node to act as termination resistances for any number of transmission lines.

Preferably, the control circuit draws current through both the reference resistor and the controllable reference resistor to develop two voltages that are applied to a differential amplifier. In some embodiments, the reference resistor and the controllable reference resistor are in series with respective additional resistances, and currents are drawn through the respective series of elements to develop the voltages at the inputs of the differential amplifier. The output of the differential amplifier is used to control the voltage at the control node and thus to control the resistance of the controllable reference resistor and any controllable termination resistors.

Operation of the control loop is as follows. If the resistance of the controllable reference resistor is too large, the differential amplifier creates an output causing the voltage at the control node to increase thereby decreasing the resistance of the controllable reference resistor. If the resistance of the controllable reference resistor is too small, the differential amplifier creates an output causing the voltage at the control node to decrease, thereby increasing the resistance of the controllable reference resistor. In this manner, the resistance of the controllable reference resistor, as well as of any other controllable termination resistors connected to the control node, are changed until their respective resistance, plus the resistance of any devices in series with the resistors, are together equal to the resistance of the reference resistor.

Thus, the present invention provides a stable resistance within an integrated circuit based on a stable reference resistance that can be maintained external to the integrated circuit.

DETAILED DESCRIPTION OF THE PREFERRED EMBODIMENTS

Figure 1:
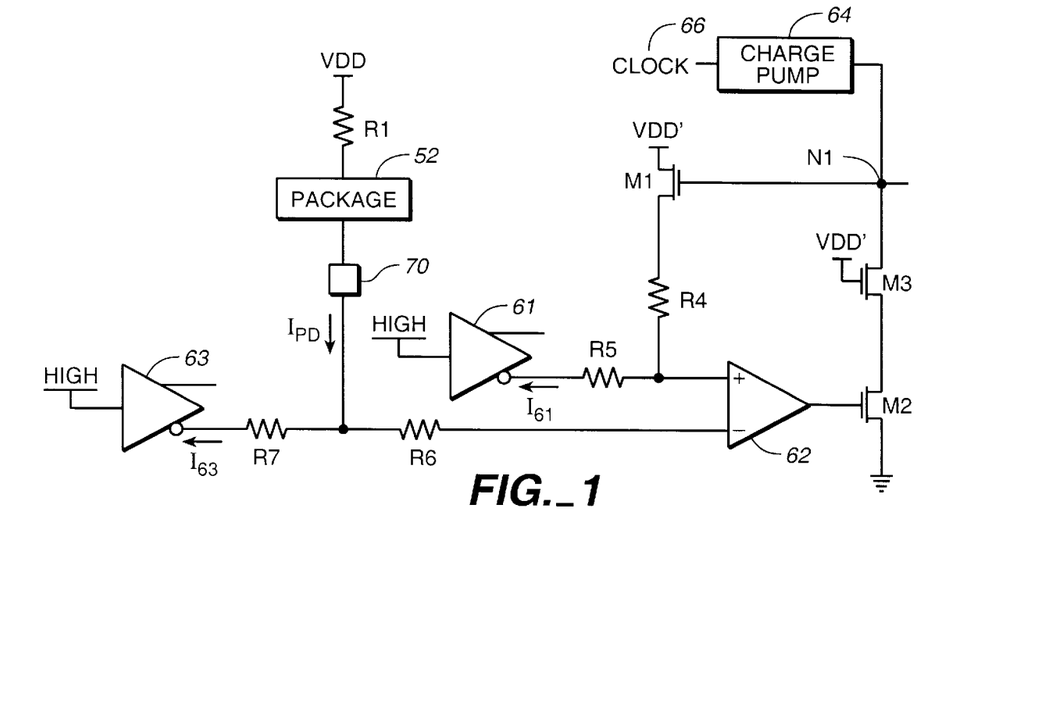
FIG. 1 is a block and circuit diagram of a bias circuit of the present invention.

FIG. 1 is a control circuit of the present invention, which produces a control voltage for controlling a termination resistance described further below. The control voltage is provided at a control node N1 and is controlled by a feedback loop.

The feedback loop is partially energized by a charge pump 64 that is driven by a clock 66 and that has its output connected to the gate of transistor M1 at control node N1. The charge pump can source a current onto node N1 even when the voltage at N1 is greater than VDD and is provided to ensure that transistor M1 operates in the triode region (such that $V_{DS} < V_{DS,\ SAT}$) where its drain-to-source voltage is proportional to its drain current. In this region, changes in the gate voltage change the proportionality between the drain current and the drain-to-source voltage. Since this proportionality is simply the on-resistance of transistor M1, changes in the gate voltage change the resistance of transistor M1. Operating in this triode region, transistor M1 is referred to as part of a controllable reference resistor.

The feedback path for the feedback loop includes transistor M1, which has its drain connected to VDD' and its source connected to one terminal of a resistor R4. The second terminal of resistor R4 is connected to the non-inverting input of differential amplifier 62 and one terminal of resistor R5. The second terminal of resistor R5 is connected to the output of a reference transmit buffer 61, which sinks current and receives a logical HIGH value at its input.

The inverting input of differential amplifier 62 is connected to ElectroStatic Discharge (ESD) protection resistor R6, which has a second terminal connected to a bond pad 70. ESD protection resistor R6 protects the inverting input of differential amplifier 62 from electrostatic discharge at bond pad 70. Bond pad 70 is connected to one terminal of a reference resistor R1 through package 52. A second terminal of resistor R1 is connected to power supply VDD. Although reference resistor R1 is shown as a resistor, those skilled in the art will recognize that any device or combination of devices providing a stable resistance may be used as reference resistor R1. Bond pad 70 and resistor R6 are also connected to one terminal of ESD protection resistor R7, which has its second terminal connected to reference transmit buffer 63, which sinks a current that is drawn through resistor R1 and ESD protection resistor R7 to develop a voltage at the non-inverting input of differential amplifier 62. ESD protection resistor R7 protects reference transmit buffer 63 from electrostatic discharge at bond pad 70. Resistors R4 and R5 match corresponding resistors R3 and R8, and R10 and R9, in FIGS. 2 and 3, discussed below.

Differential amplifier 62 produces an output that is a function of the difference between the voltage at its non-inverting input and the voltage its inverting input. If the voltage at the non-inverting input is greater than the voltage at the inverting input, the output of differential amplifier 62 is more positive. If the voltage at the inverting input is greater than the voltage at the non-inverting input, the output of differential amplifier 62 is more negative.

The output of differential amplifier 62 is connected to the gate of transistor M2, which has its source connected to ground and its drain connected to the source of transistor M3. Transistor M3 has its gate connected to VDD' and its drain connected to control node N1. Transistor M2 lowers the voltage at control node N1 as the output of differential amplifier 62 increases. Transistor M3 protects transistor M2 by limiting the drain-to-source voltage across transistor M2. Specifically, transistor M3 limits the drain-to-source voltage of transistor M2 to VDD'-$V_{Th}$, where $V_{Th}$ is the threshold voltage of transistor M3. Without transistor M3, transistor M2 would see a drain-to-source voltage in excess of VDD' that could cause transistor M2 to break down.

In operation, reference transmit buffer 63 draws a current through reference resistor R1 and ESD protection resistor R7. Similarly, reference transmit buffer 61 draws a current through transistor M1 and ESD protection resistors R4 and R5. In preferred embodiments, reference transmit buffer 61 is identical to reference transmit buffer 63 and draws an identical amount of current. In addition, ESD protection resistor R5 has the same resistance as ESD protection resistor R7. Thus, the voltage at the non-inverting input of differential amplifier 62, $V_{NI}$, can be described by the following equation:

$$V_{NI}=VDD'-I_{61} \cdot (R_{M1}+R4) \qquad \text{EQ.1}$$

where $I_{61}$ is the current produced by reference transmit buffer 61; $R_{M1}$ is the on-resistance of transistor M1 and R4 is the resistance of resistor R4. Similarly, the voltage at the inverting input of differential amplifier 62, $V_I$, is defined by the following equation:

$$V_I=VDD-I_{63} \cdot R1 \qquad \text{EQ.2}$$

where $I_{63}$ is the current produced by reference transmit buffer 63 and R1 is the resistance of resistor R1.

In preferred embodiments, VDD and VDD' are considered equal to each other and $I_{61}$ and $I_{63}$ are equal to each other. In addition, since the feedback loop provides negative feedback to the non-inverting input of differential amplifier 62, the feedback loop will continue to adjust the voltage at the non-inverting input, $V_{NI}$, until it is equal to the voltage at the inverting input, $V_I$. In light of this, EQ. 1 and EQ. 2 can be combined by setting the voltage at the non-inverting input of differential amplifier 62, $V_{NI}$, equal to the voltage at the inverting input of differential amplifier 62, $V_I$, resulting in the following equation:

$$VDD-I_{63} \cdot R1=VDD'-I_{61} \cdot (R_{M1}+R4) \qquad \text{EQ.3}$$

or $$R1=R_{M1}+R4 \qquad \text{EQ.4}$$

Thus, with the voltages at the non-inverting input and the inverting input of differential amplifier 62 equal, the resistance of reference resistor R1 is equal to the sum of the resistance of transistor M1 and resistor R4.

If the sum of the resistance of transistor M1 and the resistance of resistor R4 is less than reference resistor R1, the voltage at the non-inverting input of differential amplifier 62 will be larger than the voltage at the inverting input. This will cause the output of differential amplifier 62 to increase, causing transistors M2 and M3 to conduct a larger current thereby lowering the voltage at control node N1. As the voltage of control node N1 decreases, the resistance of transistor M1 increases. Thus, when the combined resistance of transistor M1 and R4 is less than reference resistor R1, the feedback loop causes the resistance of transistor M1 to increase until the combined resistance of transistor M1 and resistor R4 equals the resistance of reference resistor R1.

Similarly, if the combined resistance of transistor M1 and R4 is greater than the resistance of reference resistor R1, the voltage at the non-inverting input of differential amplifier 62 will be less than the voltage at the inverting input and the output of differential amplifier 62 will decrease, causing transistors M2 and M3 to conduct less current. The charge pump will then increase the voltage at control node N1 thereby decreasing the resistance of transistor M1 until the combined resistance of transistor M1 and resistor R4 matches the resistance of reference resistor R1.

Preferably, reference resistor R1 is chosen such that it has a low temperature coefficient so that its resistance does not vary appreciably with temperature. Thus, it is preferable that resistor R1 be located off the integrated circuit. As EQ. 4 indicates, the feedback circuit controls the combined series resistance of transistor M1 and resistor R4 such that it equals R1. Since R1 is off the integrated circuit and has a low temperature coefficient, it follows that the combined series resistance of transistor M1 and resistor R4 will also have a low temperature coefficient.

Figure 2:
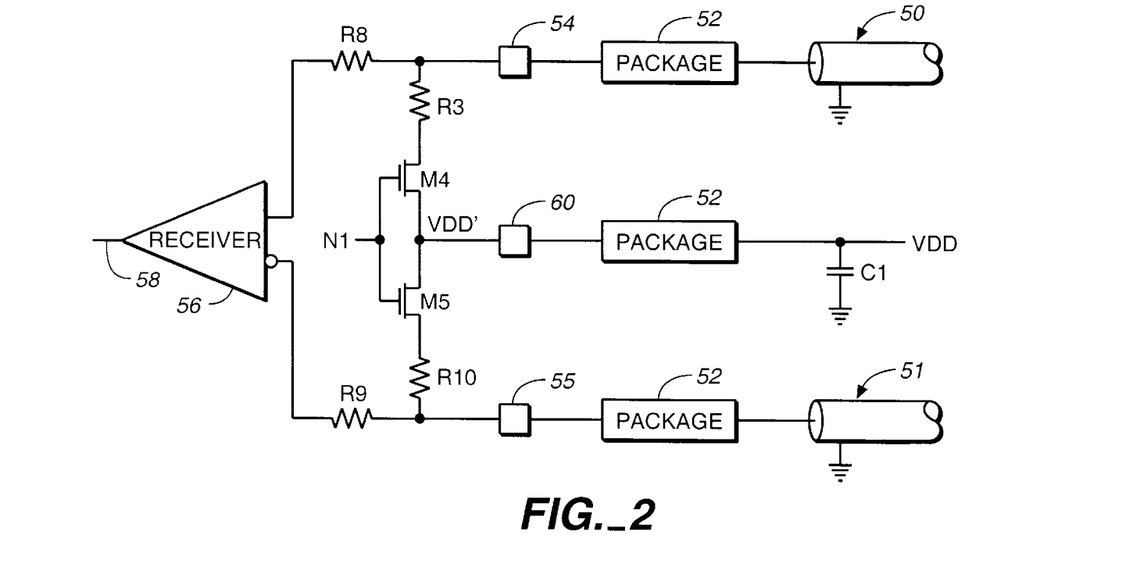
FIG. 2 is a block and circuit diagram of a termination circuit under the present invention for a receiver.

FIG. 2 shows two termination circuits of the present invention terminating two transmission lines 50 and 51 before receiver 56. Transmission lines 50 and 51 are connected through a package 52 to an integrated circuit at bond pads 54 and 55, respectively. ESD protection resistors R8 and R9 protect receiver 56 from electrostatic discharge at bond pads 54 and 55, respectively. Receiver 56 receives electrical signals carried on transmission lines 50 and 51 and provides a receiver output 58.

Bond pad 54 is also connected to one terminal of resistor R3, which has its second terminal connected to the source of transistor M4. The drain of transistor M4 is connected to bond pad 60, which provides a power supply voltage node carrying a power supply voltage VDD' from a supply voltage VDD provided through package 52. Together, transistor M4 and resistor R3 act as a controllable termination resistor and the sum of the on-resistance of transistor M4 and the resistance of resistor R3 form a termination resistance that preferably matches the impedance of transmission line 50.

Transistor M4 and resistor R3 are preferably identical devices to transistor M1 and resistor R4, respectively. Since the gate-to-source voltage of transistor M4 is the same as that of transistor M1, transistor M4 will have a resistance equal to the resistance of transistor M1. With the voltage at control node N1 is set such that the combined resistance of resistor R4 and transistor M1 equals the resistance of reference resistor R1, the combined resistance of resistor R3 and transistor M4 will also equal the resistance of reference resistor R1. Thus, through reference resistor R1 and the feedback loop in the control circuit, the controllable termination resistor represented by transistor M4 and resistor R3 can be controlled so that its resistance matches the resistance of reference resistor R1.

Transmission line 51 is terminated by a controllable termination resistor formed by transistor M5 and resistor R10 where a first terminal of resistor R10 is connected to bond pad 55, a second terminal of resistor R10 is connected to the source of transistor M5 and the drain of transistor M5 is connected to power supply node VDD'. The gate of transistor M5 is connected to control node N1 and in preferred embodiments is identical to transistors M4 and M1. Furthermore, resistor R10 is preferably identical to resistors R3 and R4. As such, the sum of the on-resistance of transistor M5 and the resistance of resistor R10 matches the resistance of transistor M1 and resistor R4 and also matches the resistance of reference resistor R1. Thus, in FIG. 2, two separate controllable termination resistors are built into an integrated circuit and their resistances are fixed to a single reference resistance.

Figure 3:
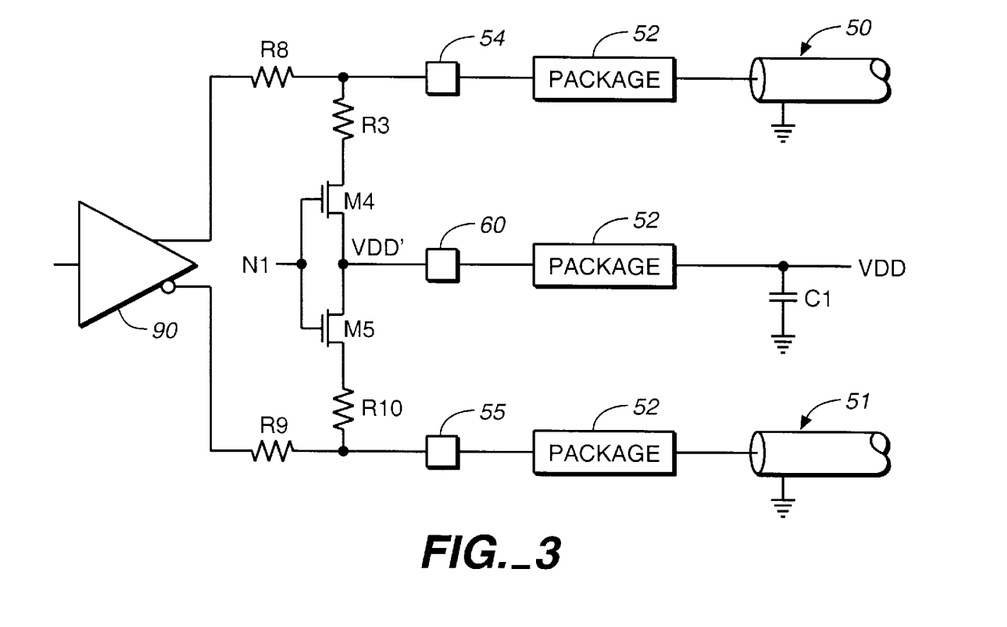
FIG. 3 is a block and circuit diagram of a termination circuit of the present invention for a transmitter.

FIG. 3 shows a third embodiment of the present invention where receiver 56 has been replaced by transmit buffer 90. The circuit elements common to FIG. 2 and FIG. 3 are numbered the same. The only difference between FIGS. 2 and 3 is the replacement of receiver 56 with transmit buffer 90 and the fact that transmission lines 50 and 51 carry signals from transmit buffer 90 to a destination instead of carrying a signal from a source to receiver 56. The termination resistance created by transistor M4 and resistor R3 and the termination resistance created by transistor M5 and resistor R10 continue to match the resistance of transmission lines 50 and 80, respectively, in FIG. 3. In addition, the termination resistances continue to be fixed and match the resistance of reference resistor R1.

Figure 4:
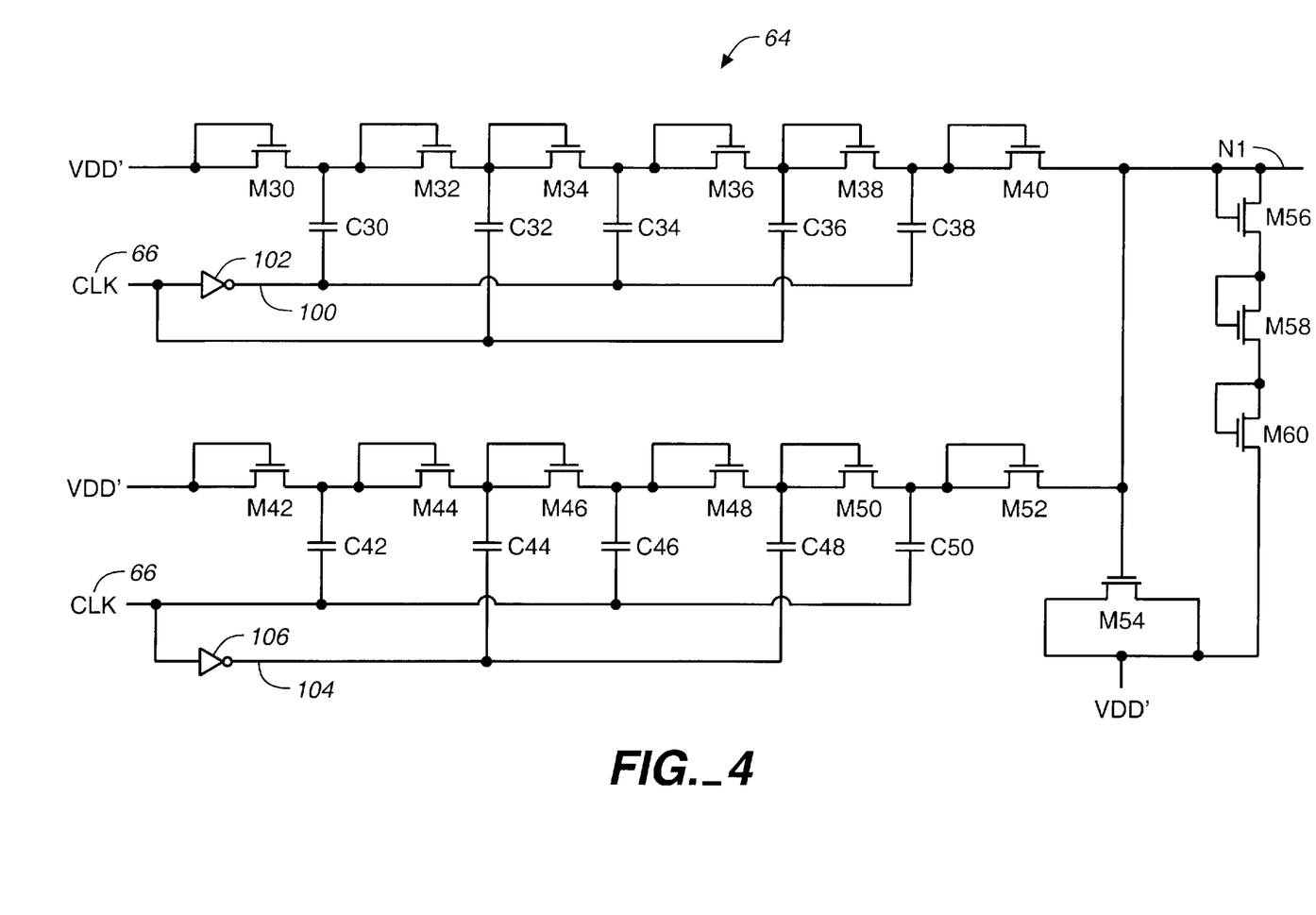
FIG. 4 is a circuit diagram of charge pump 64 of FIG. 1.

FIG. 4 is a circuit diagram of charge pump 64 of FIG. 1. Charge pump 64 can generate a voltage higher than power supply voltage VDD' through two phase shifted charge pump sub-circuits. The first charge pump sub-circuit includes a series of transistors M30, M32, M34, M36, M38, and M40, which are each configured as diodes by having their respective gates tied to their respective drains. The transistors are connected together such that the sources of transistors M30, M32, M34, M36, and M38 are connected to the drains of transistors M32, M34, M36, M38, and M40, respectively. The first charge pump sub-circuit also includes two alternating capacitor networks that preferably consist of metal-insulator-metal capacitors. The first capacitor network includes capacitors C32 and C36 with both capacitors having one terminal connected to clock 66. The second terminal of capacitor C32 is connected to the source of transistor M32, and the second terminal of capacitors C36 is connected to the source of transistor M36. The second capacitor network includes capacitors C30, C34 and C38, which have one respective terminal connected to the respective source of transistors M30, M34 and M38, respectively. The second terminals of capacitors C30, C34 and C38 are connected to a line carrying inverted clock signal 100 that is formed by inverter 102 from clock signal 66.

The first charge pump sub-circuit incrementally increases the voltage at each transistor's source by using clock signal 66 and inverted clock signal 100. For instance, when inverted clock signal 100 is low, and with the gate and drain of transistor M30 connected to VDD' in a diode configuration, the source of transistor M30 has a voltage of approximately VDD'$-V_{Th}$, where $V_{Th}$ is the threshold voltage of a transistor. When inverted clock signal 100 increases to VDD', the voltage at the source of transistor M30 increase briefly to 2(VDD')$-V_{Th}$ because the voltage across capacitor C30 cannot change instantaneously.

With inverted clock signal 100 at VDD', the increased voltage at the gate and drain of transistor M32 causes transistor M32 to conduct some of the charge away from its drain to its source thereby charging capacitor C32. This lowers the voltage at the gate and drain of transistor M32 while increasing the voltage at the source of transistor M32.

Since capacitor C32 is connected between the source of transistor M32 and clock signal 66, its second terminal is at ground when transistor M32 conducts a current. When clock signal 66 increases from ground to VDD', the voltage at the source of transistor M32 increases by VDD', shutting off transistor M32 and causing transistor M34 to conduct current.

Through this process of turning on alternate transistors in the series of transistors, the voltages at successive drains along the series of transistors increases above VDD'.

Transistor M40 marks the last transistor in the series of transistors and has its source connected to the gate of transistor 54, which has its source and drain connected to VDD' so that it acts as a large capacitor. The capacitance of transistor M54 helps reduce ripple in the voltage produced at the source of transistor M40.

To further reduce ripple, the second charge pump sub-circuit operates out of phase with the first charge pump sub-circuit. The second charge pump sub-circuit includes a second series of diode configure transistors, M42, M44, M46, M48, M50 and M52 along with their respective capacitors C42, C44, C46, C48 and C58. The phase shift between the outputs of the two charge pump sub-circuits is accomplished by connecting clock signal 66 to capacitors C42, C46 and C50 and by connecting an inverted clock signal 104 created by an inverter 106 to capacitors C44 and C48.

In contrast, in the first change pump circuit, clock signal 66 is connected to capacitors C32 and C36 and inverted clock signal 100 is connected to capacitors C30, C34 and C38. Thus, when inverted clock signal 100 goes to VDD', causing transistor M40 to conduct a current to load charge on transistor M54, clock signal 66 is low, causing transistor M52 to be off. When inverted clock signal 100 returns to ground, transistor M40 turns off and clock signal 66 increases to VDD', causing transistor M52 to conduct a current to load charge on transistor M54. By alternating the two series of transistors, a steadier voltage is produced at the gate of transistor M54.

Three transistors M56, M58 and M60 limit the output voltage produced by the charge pump. Transistor M56 has its gate and drain connected to the output of charge pump 64 at control node N1, which is at the gate of transistor M54. The source of transistor M56 is connected to the gate and drain of transistor M58, which has its source connected to the gate and drain of transistor M60. The source of transistor M60 is connected to VDD'. Thus, transistors M56, M58 and M60 are each configured as diodes between VDD' and the output of charge pump 64. Since the drain-to-source voltage across a diode-connected transistor is approximately equal to the threshold voltage, $V_{Th}$, the output voltage is limited to VDD+$3V_{Th}$ by transistors M56, M58 and M60.

Figure 5:
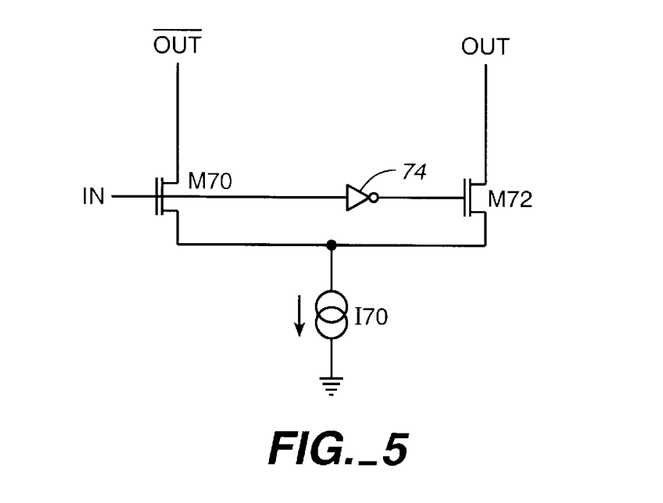
FIG. 5 is a circuit diagram of an example transmit buffer.

FIG. 5 is one example of an open-drain transmit buffer that may be used as reference transmit buffers 61 and 63 of FIG. 1, and transmit buffer 90 of FIG. 3. The open-drain transmit buffer of FIG. 5 uses a differential pair of transistors M70 and M72. The gate of transistor M70 is connected to the input terminal of the transmit buffer and the gate of transistor M72 is connected to an inverter, which inverts a signal at the input to the transmit buffer. The sources of transistors M70 and M72 are coupled together at current source I70, which has a second terminal coupled to ground. The drain of transistor M70 forms an inverted output and the drain of transistor M72 forms a non-inverted output for the transmit buffer.

In its use in FIG. 1, the transmit buffer of FIG. 5 receives a logical HIGH value at its input such that the drain of transistor M70 conducts most of the current produced by current source I70.

Figure 6:
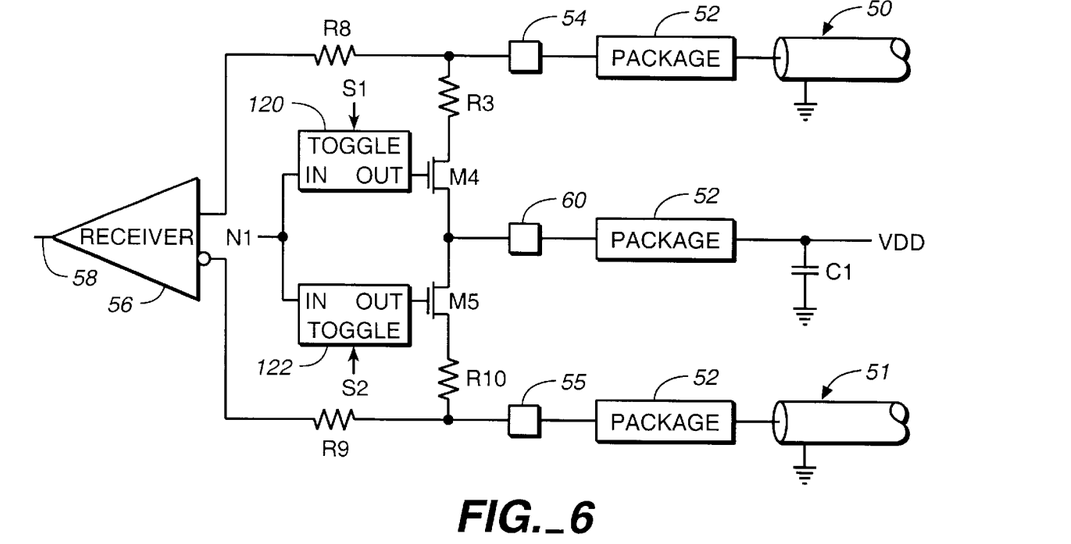
FIG. 6 is a block and circuit diagram of a termination circuit of the present invention showing switching circuits.

FIG. 6 shows the same circuit as shown in FIG. 2 with the addition of two switching blocks introduced between control node N1 and the gates of transistors M4 and M5. Specifically, switching circuit 120 is introduced between control node N1 and the gate of transistor M4 and switching circuit 122 is introduced between the gate of transistor M5 and control node N1. The circuit elements common to FIG. 2 and FIG. 6 are identically numbered and perform in the same way as described in connection with FIG. 2. Switching circuits 120 and 122 allow the termination transistors to be disabled without affecting the voltage on control node N1. Thus, switch 120 can disable transistor M4 without affecting the resistance created by transistor M5 and resistor R10. When transistor M4 is disabled by switching circuit 120, transistor M5 and resistor R10 still provide a matched resistance to reference resistor R1.

Switching circuits 120 and 122 each include a switching input TOGGLE connected to signals S1 and S2, respectively. When S1 is high, switching circuit 120 connects N1 to the gate of M4. When S1 is low, switching circuit 120 connects the gate of transistor M4 to a voltage equal to VDD'-$V_{Th}$. Similarly, when S2 is high, switching circuit 122 connects N1 to the gate of transistor M4. When S2 is low, switching circuit 122 connects the gate of transistor M5 to a voltage equal to VDD'-$V_{Th}$. Thus, switching circuits 120 and 122 act as single-pole, double-throw switches.

Figure 7:
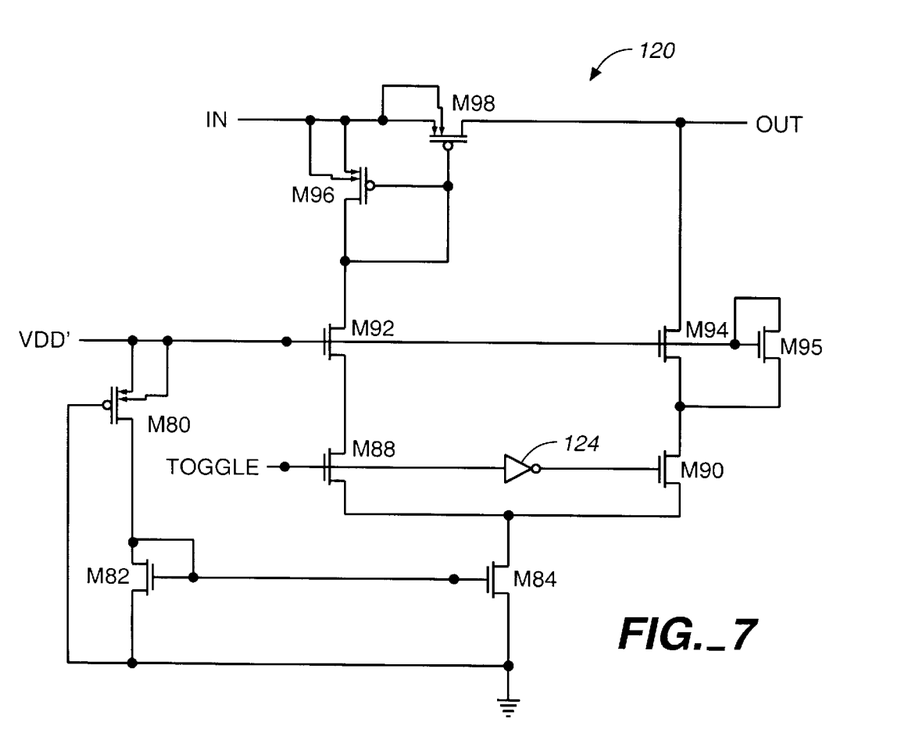
FIG. 7 is a circuit diagram of switching circuits 120 and 122 of FIG. 6.

FIG. 7 is a circuit diagram of one embodiment of switching circuit 120 of FIG. 6. A current source is formed by PMOS transistor M80, which has its source connected to VDD' and its gate connected to ground. With its gate connected to ground and its source connected to VDD', transistor M80 is always active and conducts a current through its drain. The drain of PMOS transistor M80 is connected to the gate and drain of NMOS transistor M82, which has its source connected to ground. Thus, the drain current of transistor M80 passes through transistor M82. The body of each PMOS transistor is connected to its respective source.

Mirror transistor M84 has its gate connected to the gate of transistor M82 and its source connected to ground. In this configuration, transistor M84 conducts current based on the current that passes through transistor M82. Preferably, the drain current of transistor M84 is less than one microamp.

The switching characteristics of switch 120 are controlled by switching input TOGGLE. Switching input TOGGLE is connected directly to the gate of transistor M88 and, through inverter 124, indirectly to the gate of transistor M90. Transistors M88 and M90 have their sources connected together at the drain of transistor M84, and thus act as a differential pair. The drains of transistors M88 and M90 are connected to the sources of transistors M92 and M94, respectively, which act as voltage protection for transistors M88 and M90 by limiting the maximum drain-to-source voltage across transistors M88 and M90 to VDD'-$V_{Th}$.

The drain of transistor M92 is connected to the drain and gate of PMOS transistor M96 as well as the gate of PMOS transistor M98. The sources of PMOS transistors M96 and M98 are connected to control node N1, and the drain of PMOS transistor M98 is connected to the output of the switching circuit.

When the signal on switching input TOGGLE is high relative to ground, transistor M88 is active, conducting all of the current of transistor M84, and transistor M90 is inactive, conducting no current. The current drawn by transistor M88 lowers the voltage at the gates of transistors M96 and M98, causing both PMOS transistors to become active. Thus, the voltage at control node N1 appears at the drain of transistor M98 and the output of the switching circuit.

When the signal on switching input TOGGLE is low, transistor M88 is inactive and the source-to-drain current of transistor M96 increases the voltage at the gates of transistors M96 and M98 until both devices become inactive. At this point, the voltage at control node N1 does not pass through transistor M98. At the same time that the signal of switching input TOGGLE becomes low, inverter 124 causes the voltage at the gate of transistor M90 to go high. Thus, transistor M90 conducts all of the current of transistor M84.

The drain of the transistor M90 is connected to the source of transistor M95, which has its gate and drain connected to the gate of transistor M94. Since the gates and sources of transistors M94 and M95 are tied together, and since the current of transistor M84 is being conducted through transistor M90, transistors M95 and M94 must be on, and OUT is pulled down to the voltage at the source of transistor M94, equal to VDD-$V_{Th}$.

NMOS transistors M94 and M95 thus limit the output low voltage when switching circuit 120 disables transistor M4 from control node N1. In particular, with M94 and M95 active, the output of switching circuit 120 is limited to VDD'-$V_{Th}$. As discussed in connection with FIG. 4, the maximum possible voltage at control node N1 is VDD'+$3V_{Th}$. Thus, the maximum voltage drop across transistor M98 when the switching signal at switching input TOGGLE disables transistor M5 from control node N1 is $4V_{Th}$.

Figure 8:
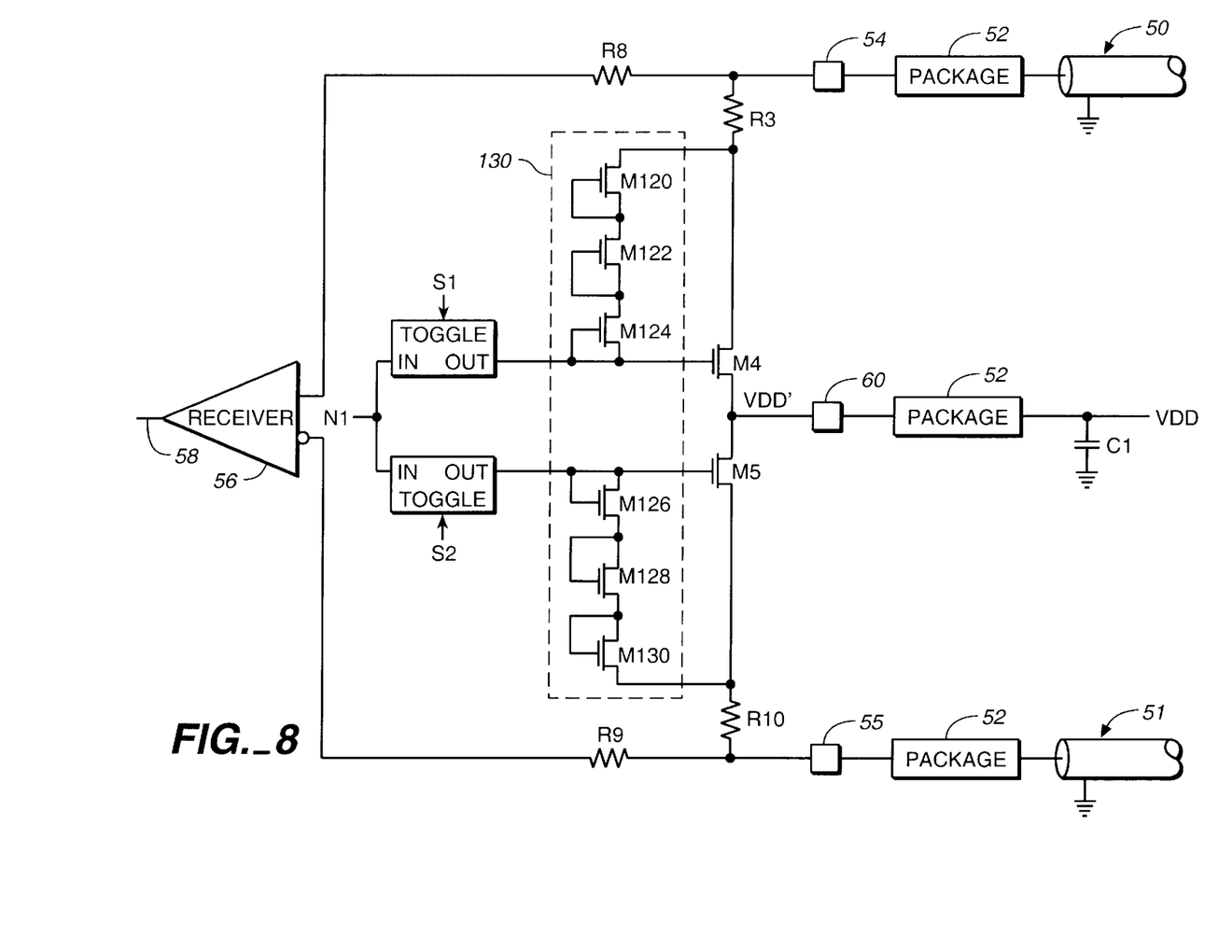
FIG. 8 is a partial circuit diagram of an additional embodiment of the present invention.

FIG. 8 shows a circuit diagram of the embodiment of FIG. 6 with additional components added for ground-fault protection. In the diagram of FIG. 8, circuitry used to generate the voltage at control node N1 has been omitted for simplicity and only control node N1 is shown in FIG. 8. Those skilled in the art will recognize that although only control node N1 is shown, all of the circuitry shown in FIG. 2 to produce the voltage on control node N1 is implicitly part of the circuit of FIG. 8.

In FIG. 8, transistors M120, M122, M124, M126, M128 and M130 form a clamping circuit to protect transistors M5 and M4. Specifically, if pad 54 or pad 55 is accidentally grounded, the gate-to-source voltage across transistor M5 or M4 will be no larger than $3V_{Th}$ because of the clamping circuit.

In reference to transistor M4, the voltage is limited by transistors M120, M122 and M124, which are configured as diodes. Specifically, transistor M124 has its gate and drain connected to control node N1 and the gate of transistor M4. Transistor M124's source is connected to the gate and drain of transistor M122. The source of transistor M122 is connected to the gate and drain of transistor M120, which has its source connected to the source of transistor M4. Thus, if pad 54 is grounded, transistors M120, M122 and M124 will all be active and each of their drain-to-source voltages will equal the threshold voltage, $V_{Th}$. As such, $V_{DS,M4}$ is limited to $3V_{Th}$.

Similarly, transistors M126, M128 and M130 are connected in series in diode configurations to limit the gate to source voltage across transistor M5 to $3V_{Th}$. Specifically, the gate and drain of transistor M126 is connected to the gate of transistor M5. The source of transistor M126 is connected to the gate and drain of transistor M128, which has its source connected to the gate and drain of transistor 130. The source of transistor M130 is connected to the source of transistor M5.

Although the claims and the specification refer to matching the controllable reference resistor to the reference resistor and matching the controllable termination resistor to the reference resistor, those skilled in the art will recognize that such matching includes matching the controllable reference resistor and controllable termination resistor to scaled values of the reference resistor. The scaling can be easily accomplished by drawing a different current through the reference resistor than through the controllable reference resistor. As such, references to matching the controllable reference resistor to the reference resistor or matching the controllable termination resistor to the reference resistor should be read broadly to include matching these resistors to scaled values of the reference resistor.

Although the present invention has been described with reference to preferred embodiments, workers skilled in the art will recognize that changes may be made in form and detail without departing from the spirit and scope of the invention.

What is claimed is:

1. A circuit for providing a termination resistance to a transmission line, the circuit comprising:
   a reference resistor;
   a controllable termination resistor, coupled between the transmission line and a termination voltage node, and coupled to and controllable through a control node;
   a control circuit, coupled to the reference resistor and the control node; and
   a power supply voltage, the termination voltage node at the power supply voltage and the control node capable of having a control voltage of greater magnitude than the power supply voltage.

2. The circuit of claim 1 wherein the controllable termination resistor comprises a termination transistor.

3. The circuit of claim 1 wherein the control circuit comprises a feedback loop.

4. The circuit of claim 3 wherein the control circuit comprises at least one controllable reference resistor, the controllable reference resistor capable of being matched to the reference resistor.

5. The circuit of claim 4 wherein the controllable reference resistor comprises a reference transistor, and the controllable termination resistor comprises a termination transistor similar to the reference transistor, and wherein the reference transistor and the termination transistor are connected together at the control node.

6. The circuit of claim 4 wherein the feedback loop comprises a differential amplifier having first and second inputs and an output, the first input coupled to a first input circuit that is further coupled to the controllable reference resistor and the second input coupled to a second input circuit that is further coupled to the reference resistor, the output coupled to an output circuit that is further coupled to the control node.

7. The circuit of claim 4 wherein the control circuit further comprises a control current source coupled to the controllable reference resistor.

8. The circuit of claim 7 wherein the control circuit further comprises a reference current source coupled to the reference resistor.

9. The circuit of claim 1 further comprising a second controllable termination resistor coupled between a second transmission line and a termination voltage node and coupled to the control node.

10. The circuit of claim 9 further comprising a first switching circuit, the first switching circuit coupled between the control circuit and the controllable termination resistor.

11. The circuit of claim 1 further comprising a voltage limiting circuit, coupled across at least a portion of the controllable termination resistor.

12. The circuit of claim 11 wherein the voltage limiting circuit comprises at least one diode-connected transistor.

13. A method of terminating a transmission line, the method comprising:
   connecting the transmission line to a controllable termination resistor that is coupled to a power supply voltage in an integrated circuit;
   generating a reference electrical value dependent on the resistance of a reference resistor;
   generating a termination electrical value dependent on the resistance of the controllable termination resistor; and
   using the reference electrical value and the termination electrical value to change a voltage that is greater than the power supply voltage in order to chance the resistance of the controllable termination resistor so that it matches the resistance of the reference resistor.

14. The method of claim 13 wherein generating the termination electrical value comprises using a controllable reference resistor that has a resistance that matches the resistance of the controllable termination resistor.

15. The method of claim 14 wherein the termination electrical value is a voltage generated by passing a current through the controllable reference resistor.

16. The method of claim 15 wherein the reference electrical value is a voltage generated by passing a current through the reference resistor.

17. An apparatus for providing a resistance between a conductor and a termination node, coupled to a supply voltage the apparatus comprising:
   a reference resistor;

a controllable termination resistor, coupled between the termination node and the conductor; and control means, coupled to the reference resistor and the controllable termination resistor for matching the resistance of the controllable termination resistor to the resistance of the reference resistor by applying a voltage greater than the supply voltage to a portion of the controllable termination resistor.

18. The apparatus of claim 17 further comprising a plurality of controllable termination resistors, coupled between the termination node and a plurality of conductors, and coupled to the control means, the control means for matching the resistances of each of the plurality of controllable termination resistors to the resistance of the reference resistor.

19. The apparatus of claim 18 wherein the control means comprises a controllable reference resistor, and wherein the resistance of the controllable reference resistor is matched to the resistance of the reference resistor.

20. An electronics system for performing electronics functions, the system comprising:

an electrical circuit;

transmission means coupled between the electrical circuit and a remote location, for providing a communication path between the electrical circuit and the remote location; and termination means, coupled between the transmission means and a termination node that provides a supply voltage, the termination means comprising a controllable termination resistor coupled between the transmission means and the termination node, a reference resistor, and control means coupled between the reference resistor and the controllable termination resistor for setting the resistance of the controllable termination resistor equal to a value that is proportional to the resistance of the reference resistor by providing a voltage that is larger than the supply voltage to a portion of the controllable termination resistor.

21. The system of claim 20 further comprising:

a plurality of transmission means, coupled between the electrical circuit and the remote location, for providing a plurality of communication paths between the electrical circuit and a plurality of remote locations; and a plurality of controllable termination resistors coupled between the plurality of transmission means and a termination node, and coupled to the control means, the control means for setting the resistances of the plurality of controllable termination resistors equal to a value that is proportional to the resistance of the reference resistor.

22. A switching circuit in an integrated circuit having a power supply voltage, the switching circuit comprising:

an input, the input adapted to be coupled to a voltage greater than the power supply voltage;

a switching transistor, positioned between the input and an output and adapted to operate in a first and second state, in the first state the switching transistor providing a current path from the input to the output, in the second state the switching transistor interrupting a current path from the input to the output;

a control input;

a control circuit, coupled to the control input and the switching transistor; and a pull down circuit, connected to the control circuit and the output and adapted to lower the voltage at the output when the switching transistor is in the second state while limiting the voltage drop across the switching transistor to less than a voltage at which the switching transistor is damaged.

23. The switching circuit of claim 22 wherein the control circuit comprises a first control transistor having first, second and third terminals and a second control transistor having first, second and third terminals, the first terminal of the first control transistor coupled to the control input, the first terminal of the second control transistor coupled to one terminal of an inverter, the inverter having a second terminal coupled to the control input.

24. The switching circuit of claim 23 wherein the switching transistor has a first terminal coupled to the input, a second terminal coupled to the output, and a third terminal coupled to the control circuit.

25. The switching circuit of claim 24 wherein the control circuit further comprises a third control transistor having first, second and third terminals, the first terminal coupled to the input, the second and third terminals coupled to the third terminal of the switching transistor.

26. The switching circuit of claim 25 wherein the control circuit further comprises a buffer transistor having first, second and third terminals, the first terminal coupled to the third terminal of the switching transistor, the second terminal coupled to the first control transistor and the third terminal coupled to a fixed voltage.

27. The switching circuit of claim 24 wherein the buffer transistor and the fixed voltage together limit a voltage across the first control transistor to less than a voltage at which the first control transistor is damaged.

28. The switching circuit of claim 23 wherein the pull down circuit comprises a supply buffer transistor having a first terminal coupled to the output, a second terminal coupled to the second control transistor, and a third terminal coupled to a fixed voltage.

29. The switching circuit of claim 28 wherein the pull down supply circuit further comprises a diode-configured transistor having a first and second terminal coupled to the third terminal of the supply buffer transistor and a third terminal coupled to the second terminal of the second control transistor.

* * * * *